United States Patent [19]
George et al.

[11] 4,215,954
[45] Aug. 5, 1980

[54] WORKPIECE DISENTANGLER

[75] Inventors: Vivian C. George, Walsall; Cyril J. Webb, Birmingham; Roy Whitmore, Brereton, all of England

[73] Assignee: Concentric Production Research Limited, Sutton Coldfield, England

[21] Appl. No.: 927,756

[22] Filed: Jul. 25, 1978

[30] Foreign Application Priority Data

Jul. 26, 1977 [GB] United Kingdom ............... 31239/77

[51] Int. Cl.² ............................................. B65G 51/02
[52] U.S. Cl. .................................... 406/137; 198/953
[58] Field of Search ......................... 302/2 R; 198/953; 209/676, 906; 221/278; 214/8.5 E; 414/116 (U.S. only); 406/137, 136

[56] References Cited

U.S. PATENT DOCUMENTS

| 1,149,595 | 8/1915 | Pipe et al. | 302/2 R X |
| 3,625,570 | 12/1971 | Ford | 198/953 X |
| 3,679,097 | 7/1972 | Gunter | 198/953 X |

FOREIGN PATENT DOCUMENTS

522042 9/1976 U.S.S.R. ................................. 302/2 R

*Primary Examiner*—Jeffrey V. Nase
*Attorney, Agent, or Firm*—Scrivener, Parker, Scrivener and Clarke

[57] ABSTRACT

Apparatus for disentangling workpieces is described which consists of a container into which the entangled workpieces are placed, a series of air jets located in the base of the container, and an outlet assembly consisting of a pair of overlapping relatively slidable comb-shaped plates defining a series of slots of adjustable width. An electropneumatic circuit is arranged periodically to widen the slots to release any trapped workpieces, and to shut off the blowing air immediately prior to widening of the slots. A circulatory flow of the workpieces is established in the container and the disentangling is brought about primarily by the brushing action of the workpieces against the slots.

10 Claims, 6 Drawing Figures

WORKPIECE DISENTANGLER

SPECIFIC DESCRIPTION

This invention relates to an apparatus and method for disentangling elongate workpieces of the kind, such as coiled springs, which tend normally to become interengaged or entangled, the apparatus being of the kind comprising a container defining a chamber, inlet means for introducing air under pressure into the chamber, and outlet means through which work pieces pass in use, the container being provided with means to enable workpieces to be introduced into the chamber.

U.S. Pat. No. 3,346,305 of J. Heymann discloses such a spring disentangler and dispenser comprising an inclined cylindrical closed container provided adjacent to its base with a single air jet which is arranged to blow springs placed within the container in a helical path to a single outlet located in the sidewall of the container adjacent to a hinged lid of the container. The outlet comprises a circular hole located at one end of a guide channel, and spring pass through the hole one by one into a dispensing tube. Since that device has only a single outlet the rate at which disentangled springs are dispensed is limited. Also, the capacity of that device is severely restricted since springs may only fill the lower portion of the container.

Our earlier U.K. Specification No. 1,281,523 describes and claims apparatus for dispensing workpieces comprising a chamber incorporating opposed end closure assemblies in one of which is provided means for introducing air under pressure into the chamber through a series of jet orifices, outlet means located in the chamber at a point remote from said one end closure assembly, and at least one normally closed opening permitting the introduction into the chamber of workpieces to be dispensed, the arrangement being such that, when the chamber is vertical with the said one end closure assembly at its lowermost end, the outlet means is above said one end closure assembly and air issuing from the jet orifices causes workpieces within the chamber to be directed upwardly and to be discharged through the outlet means under the influence of air escaping therethrough.

The outlet means disclosed in this latter specification comprises one or more unions each having a circular bore and extending through the wall of a generally cylindrical chamber. The unions are inclined to the axis of the chamber and have their inner ends flush with the inner wall of the chamber so that each bore presents an elliptical end to the interior of the chamber.

Although it is possible with our earlier apparatus to provide several outlet unions, the total rate at which disentangled springs are dispensed is limited by the total cross-sectional area of the bores of the outlet unions.

Also, with our earlier apparatus springs could become jammed in the bores of the outlet unions necessitating in most cases the provision of means to blow air back through those bores. The provision of such blowback means was relatively costly.

The present invention is concerned with a dispenser of the kind set forth in which the outlet means comprises one or more slots, rather than one or more holes as in previous constructions.

We are aware of U.S. Pat. No. 2,348,738 of Harvey which discloses a rivet dispenser in which slots are provided in one wall of the dispensing container. Those slots, however, act only as air vents to prevent build-up of air pressure within the container, the outlet means comprising a guide track extending from within the chamber.

Thus according to the present invention in apparatus of the kind set forth the outlet means comprises one or more slots each having a transverse width substantially equal to the transverse dimension of the workpiece to be dispensed.

Such an apparatus may be designed to have a substantially greater rate of disentangling workpieces than the prior art devices previously referred to, and will usually be capable of disentangling components which are too entangled to be separated and dispensed by the apparatus previously referred to. Often, the components may not be capable of being dispensed through the tubes of such apparatus because they would become entangled within the tubes.

When the workpieces, such as fine springs, possess substantial resilience, the optimum width of each slot for maximum throughput of separate workpieces may be slightly less than the transverse dimension of the workpieces, since the workpieces may be capable of squeezing or screwing themselves through the undersize slot.

In the prior art construction the cross-sectional area of the outlet means was relatively limited, and often a long dispensing tube was attached to the outlet means to convey the workpieces to a remote location. It was therefore necessary with such constructions to produce a substantial pressure within the chamber to provide an adequate flow of workpieces through the dispensing tube. The container had to be carefully sealed to prevent wastage of compressed air, and a filler opening for insertion of workpieces had to be carefully sealed. When slots are used the working pressure within the chamber will usually be considerably less than with the prior art constructions, and it should therefore be understood that the devices in accordance with the invention need not necessarily employ a completely closed container. Sometimes it will be possible to provide the container with a permanently open filler opening through which workpieces may be inserted into the chamber, the flow of workpieces within the chamber being such that they are not directed to the filler opening.

Preferably each slot is adjustable in width to deal with workpieces of a range of sizes. With the previous devices it has been necessary to exchange the outlet means to dispense workpieces of different sizes.

The opposite sides of each slot are preferably defined by two relatively movable members, means being provided to move the members relative to each other to widen each slot and enable any jammed workpieces to release itself or be released.

Means may be provided to detect when a workpiece has become jammed, but preferably the slots are periodically widened and means are provided to cut off or substantially reduce the air flowing through the inlet means immediately prior to widening of the slot or slots, the slot or slots being closed again prior to restoration of the inlet air flow.

When there is only a single slot of adjustable width the sides of the slot may be defined by the edges of two co-planar plates, but when there is a plurality of adjustable slots conveniently these are defined by pairs of overlapping parallel slots formed in two relatively slidable plates held in face contact with each other.

Each slot may be curved or of any suitable shape, but preferably each slot is straight when the slot is of adjustable width to enable its adjustment to be effected by linear movement of one slot-defining member relative to the other.

Each slot is preferably defined in a flat plate assembly which is arranged at an angle of between 0° and 90° to the upward vertical.

For maximum efficiency the angle will usually be in the range 25° to 65°, and is preferably 45°.

When one or more straight slots are defined in such a flat plate assembly each slot may be oriented at any angle in the plane of the plate assembly but preferably each slot is orientated in a vertical plane.

When slidable plates are used, one of the relatively slidable plates may be fixed in position relative to the remainder of the container, and preferably the fixed plate is the plate that is outermost of the container when straight slots are vertical or inclined in use to the vertical to enable dispensed workpieces to be led away from the lower ends of the slots in the fixed plate to separate locations.

Preferably the arrangement of the container and of the inlet means is such that a circulatory flow of workpieces is produced in the chamber of the container, the slot or slots extending substantially tangentially to the workpiece flow path so that workpieces are brushed along the slot or slots.

Preferably the arrangement is such that when the container is orientated with the inlet means lowermost the slot or slots are located in an upper region of the container so that when the inlet air is cut off the workpieces fall into the vicinity of the inlet means.

Preferably the inlet means comprises a series of jet orifices.

When the inlet mean is located in a lower region of the container, the lower region of the container is preferably closed apart from said inlet means.

According to a second aspect of the invention a method of disentangling workpieces comprises inserting them into appaatus in accordance with the first aspect of the invention and then dispensing the springs through the slot or slots by blowing air through the inlet means.

The invention will now be described, by way of example only, with reference to the accompanying drawings in which.

Figure 1:
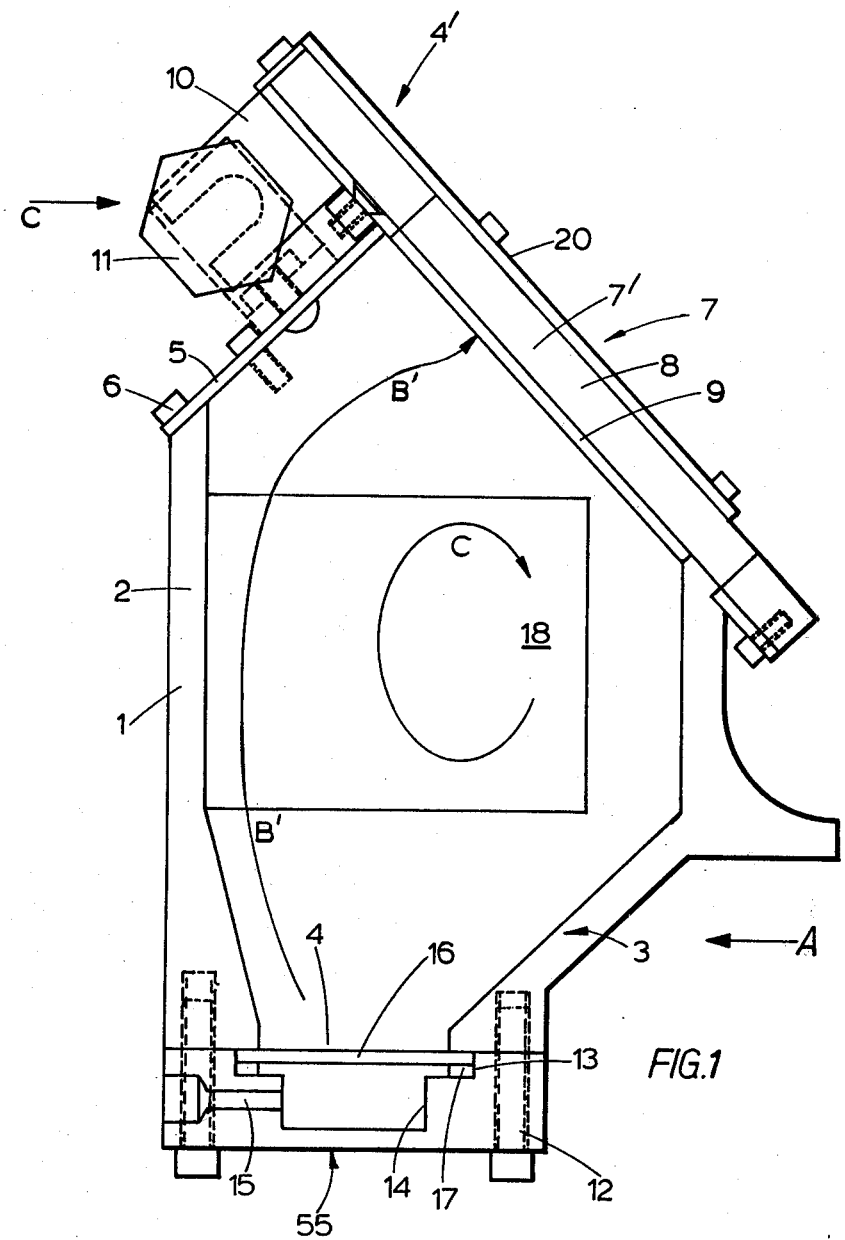
FIG. 1 is a partial cross-sectional side elevation of a spring disentangler in its position of use; the section being taken on the line 2—2 of FIG. 2.
Figure 2:
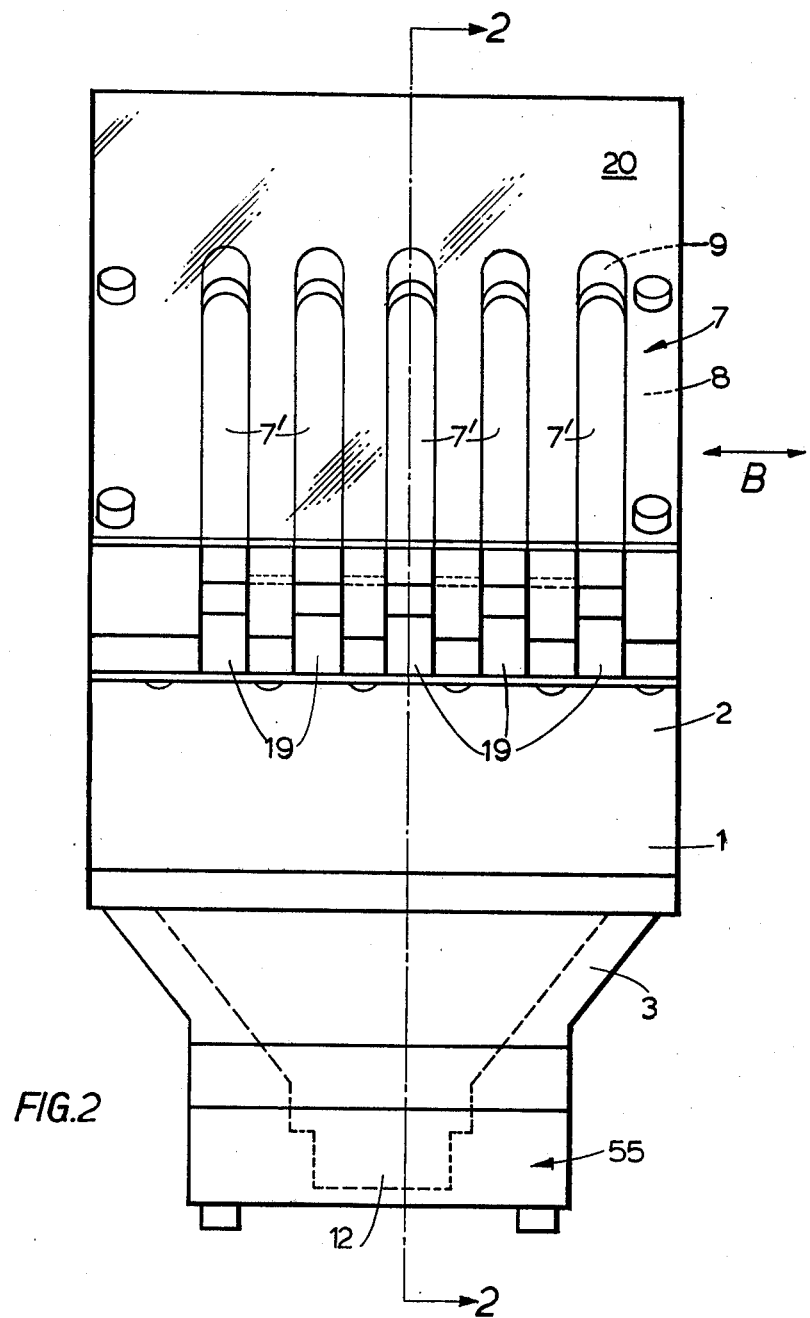
FIG. 2 is a view of the disentangler looking in the direction of the arrow A in FIG. 1, with the adjustable slots being shown in the fully open position.
Figure 3:
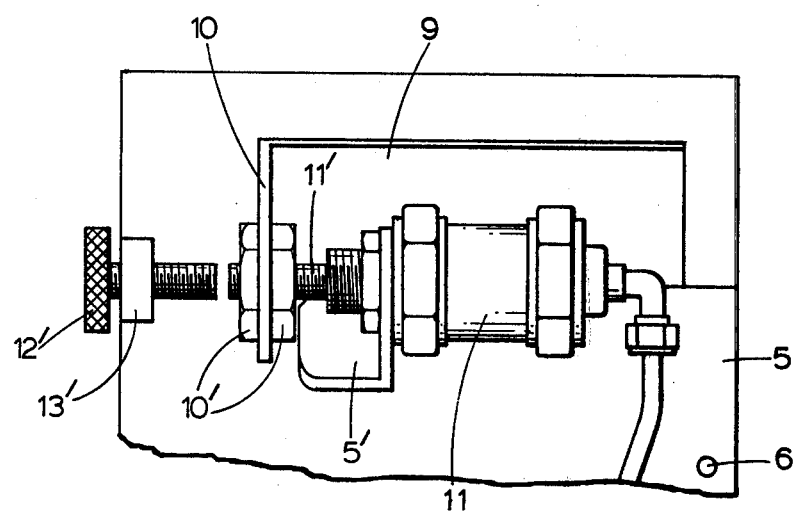
FIG. 3 is a view of the upper part of the disentangler looking from the direction of the arrow C in FIG. 1.

Referring to FIGS. 1 to 3 the disentangler comprises a body 1 having an upper portion 2 comprising a substantially square-section tube integral with a lower portion 3 of distorted frusto-conical shape provided in its base with a round aperture 4 closed by an inlet assembly 55. As shown in FIG. 1 the centre of the aperture 4 is offset horizontally, to the left in FIG. 1, from the axis of the upper portion 2. The upper portion 2 is closed at its upper end by an outlet assembly 4' comprising an oblong-rectangular closure plate 5 secured by screws 6 to the body 1 and extending normally to a plate assembly 7 defining five parallel adjustable straight outlet slots 7'.

The plate assembly 7 extends at an angle of 45° to the upward vertical and comprises a thin transparent plastics cover 20 secured to a relatively thick fixed outer plate 8, and a thin inner plate 9 which is slidably guided in face contact with plate 8 in the horizontal direction B, indicated in FIG. 2. Each of the plates 8 and 9 is formed with a series of five equally spaced parallel straight slots of equal widths, and the plate 9 is capable of being moved to bring the corresponding slots of the two plates substantially into register with each other as shown in FIG. 2. The slots in both plates 8 and 9 are closed at their upper ends but open at their lower ends, so that plates 8 and 9 are each of the form of a comb.

Movable plate 9 is provided on its underside with a lug 10 to which is adjustably secured the piston rod 11' of a single-acting pneumatic piston and cylinder assembly 11 mounted by means of bracket 5' on plate 5 and capable of moving plate 9 between the position shown in FIG. 2 and a position in which the slots are reduced in width to approximately the diameter of the components to be disentangled. Lug 10 is secured to piston rod 11' by means of two nuts 10', shown in FIG. 3, threadedly engaged with a threaded end portion of rod 11'. The travel of the piston rod 11' to the left in FIG. 3 is controlled by an adjustable abutment in the form of a screw 12' threadedly engaged with a lug 13' secured to plate 5. Thus screw 12' controls the minimum width to which slots 7' are closed on actuation of piston and cylinder assembly 11. Nuts 10' are adjusted during manufacture so that the slots in plates 8 and 9 are substantially in register when piston rod 11 is fully retracted.

The inlet assembly 55 comprises a block 12 of round shape in plan provided in its upper surface with a stepped blind bore of square-shape in cross-section comprising bore portions 13 and 14. An air inlet 15 communicates with bore portion 14 and an orifice plate 16 backed by a resilient annular gasket 17 is received in bore portion 13. The orifice plate is provided with any suitable pattern of holes constituting jet orifices. In one example the plate is formed with sixteen circumferentially spaced holes together with four holes adjacent to its centre.

The offsetting cf the axis of the orifice plate 16 from that of the upper portion 2 of the body 1 gives rise to flow of air within the chamber tangential to the workpieces as indicated by the arrow B' in FIG. 1 when a compressed air supply is connected to the inlet 15, with the result that a ball of tangled springs inserted into the chamber of the container through a pivoted transparent door 18 in one sidewall of the upper portion 2 is spun generally about a horizontal axis, as indicated by the arrow C, and is brushed against the plate assembly 7.

The dispenser described is capable of disentangling a very wide variety of components often of intricate shapes, such as clips of cranked shape.

An electro-pneumatic circuit, to be described hereinafter, is connected to the air inlet 15 and to the piston and cylinder assembly 11 and is arranged every three seconds to cutt off the air supply to the inlet 15, de-actuate assembly 11 to open fully the outlet slots 7' and allow any tangled springs which have become jammed in the slots to fall back into the chamber, then to actuate assembly 11 and reconnect the air supply to inlet 15.

It will be appreciated that the open lower ends 19 of the slots in the fixed outer plate 8 may be connected to respective guides for conveying the individual springs to convenient locations. Alternatively the springs may be allowed to fall into a suitable receptacle or hopper secured to or placed alongside the body 1.

In a modification of the device shown in the drawings the plate assembly 7 is pivotally connected to the remainder of the assembly to enable springs or other workpieces to be inserted through the upper end of the body, and the pivotal axis of the plate assembly 7 is made coincident with the axis of the piston and cylinder assembly 11 to allow a simple connection between the piston rod and plate 9.

Although in the assembly shown in the drawings the plate assembly 7 is inclined to the vertical, it would be possible for the plate assembly to be arranged in a horizontal plane, although additional means may then be required to convey away the springs issuing from the slots.

It will be appreciated that the air jet or jets may be located in any part of the chamber provided that they cause the workpieces contained in the chamber to impinge upon the outlet slot or slots.

Figure 4:
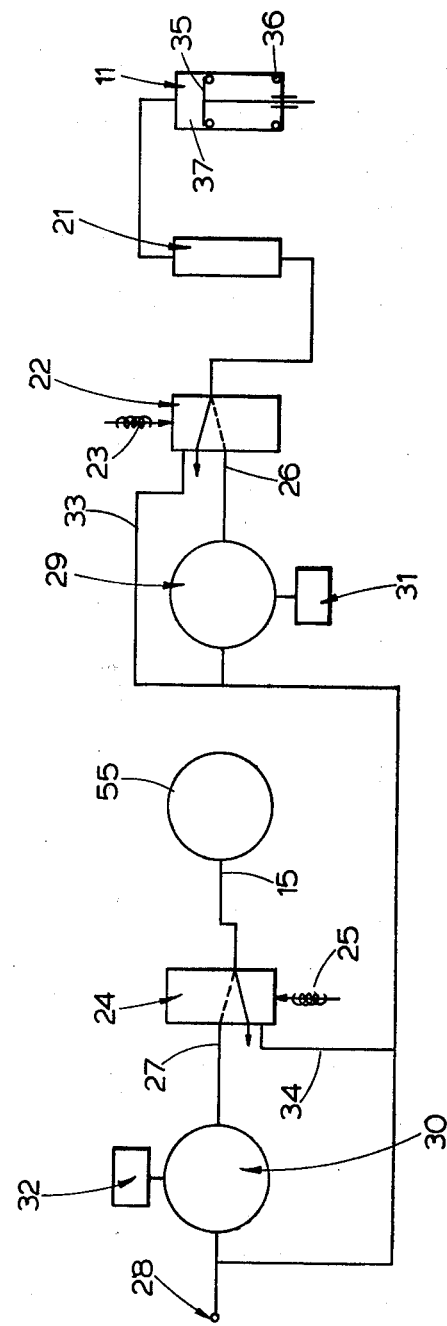
FIG. 4 is a penumatic circuit diagram of an electro-pneumatic circuit for use with the disentangler of FIGS. 1 and 2.

The electro-pneumatic circuit controlling the operation of the disentangler of FIGS. 1 and 2 will now be described. With reference to FIG. 4, the single-acting piston and cylinder assembly 11 is supplied with air through a two-way flow regulator 21 by a first wave 22 operated by a first solenoid 23, and the inlet 15 of the inlet assembly 55 is supplied with air by a second valve 24 controlled by a second solenoid 25. Inlets 26 and 27 of the first and second valves 22 and 24 respectively are connected to a compressed air supply 28 through adjustable pressure regulators 29 and 30 respectively provided with respective pressure gauges 31 and 32. Valves 22 and 24 also have pilot connections 33 and 34 respectively with air supply 28.

Piston and cylinder assembly 11 comprises a piston 35 biassed upwardly in FIG. 4 by a coil spring 36 to a retracted position in which the slots in plate assembly 7 are in their fully open condition. When first solenoid 23 is de-activated pressure space 37 of assembly 11 is connected to atmosphere by first valve 22, and similarly when second solenoid 25 is de-activated air inlet 15 is connected to atmosphere by second valve 24.

Figure 5:
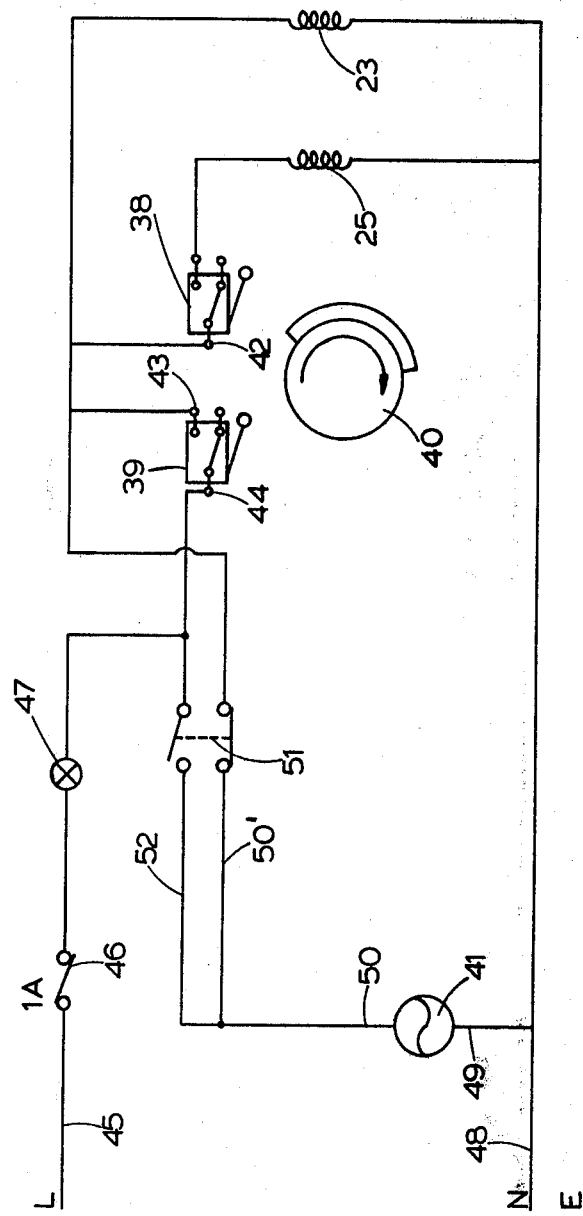
FIG. 5 is an electrical circuit diagram of the electro-pneumatic circuit.

With reference to FIG. 5 energisation of the first and second solenoids 23 and 25 is controlled by microswitches 38 and 39 arranged to be operated by a variable rotary cam 40 driven by a constant speed motor 41, switch 39 controlling directly first solenoid 23, and the input 42 of switch 38 being fed from the output 43 of switch 39 such that second solenoids 25 is energised only when first solenoid 23 is also energised. This ensures that air is not blown into the disentangler chamber when the slots 7' in plate assembly 7 are in their fully open condition, which would otherwise lead to tangled springs being dispensed through the wide slots.

The input 44 of switch 39 is connected to a supply line 45 through a fuse 46 and an indicator bulb 47. Cam motor 41 has one terminal 49 connected permanently to supply line 48 and its other terminal 50 connected by lead 50' to the output 43 of switch 39 when push-switch 51 is in the condition shown, or by lead 52 directly to supply line 45 when push-switch 51 has been actuated, the effect of this arrangement being to re-set cam 40 on de-actuation of switch 51, as will be further explained.

The operation of the electro-pneumatic circuit will now be described. Initially switch 51 is in the position shown in FIG. 5, the slots are at their maximum width, and the air supply is cut off from both the piston and cylinder assembly 11 and from the air inlet 15. Although the input 44 is live, output 43 is isolated from the live supply 45 because the switch arm of switch 39 is engaged with the low part of cam 40.

On actuation of switch 51 the cam motor 41 is energised through lead 52 and the cam 40 is set turning in the clockwise direction. When the high part of cam 40 comes into engagement with the switch arm of switch 39 the output 43 is made live and the first solenoid 23 is energised. Compressed air to a pressure determined by regulator 29 is then supplied through flow regulator 21 to pressure space 37 to reduce the width of the slots to the adjusted minimum width determined by screw 12'. The switch arms of the switches 38 and 39 are arranged such that there is a delay before switch 38 is actuated after actuation of switch 39, to allow the slots to be reduced to their operating width before the second solenoid 25 is actuated to supply air inlet 15 with compressed air by actuation of second valve 24.

After 2 seconds switch 39 is de-actuated by cam 40, and after a small time delay of approximately 0.3 seconds switch 38 is also de-actuated. On de-actuation of switch 39 and first solenoid 23 pressure space 37 of assembly 11 is connected to atmosphere through flow regulator 21 which provides sufficient time delay in the retraction of piston 35 to ensure that the air supply to inlet 15 has been terminated before the slots have begun to widen. The slots 7' are maintained fully open for approximately 0.75 seconds determined by cam 40 to allow any jammed spring to fall back into the chamber before a new cycle is initiated by the high part of cam 40. Since air is fed through flow regulator 21 in the forward direction from a pressure supply but is returned by only the force of spring 36, the flow regulator 21 produces a greater delay on de-actuation of solenoid 23 than on its actuation to ensure that the slots are not substantially opened whilst the springs are being agitated.

On de-actuation of switch 51 the cam motor 41 remains energised through lead 50 until switch 39 has been de-actuated by cam 40, cam 40 then being positioned in readiness to commence a complete new cycle on re-actuation of switch 51. This ensures that the springs cannot at any time be blown out of the chamber through the slots when the slots are fully open.

When a batch of workpieces of a new size is first inserted into the device the screw 12' is rotated to produce on adjusted minimum width of slot 7' which is insufficient to permit the dispensing of workpieces, and with switch 51 actuated the screw 12' is unscrewed until the workpieces begin to be dispensed through the slots 7'.

Typically compressed air supply 28 has a pressure of 40–150 p.s.i., pressure regulators 29 and 30 are set at 25 and 20 p.s.i. respectively, spring 36 is overcome by a pressure of 10 p.s.i. in chamber 37, the maximum width of slots 7' is 0.5 inch, and the adjusted reduced width of the slots 7' is 10 mm for feeding springs of that diameter.

The above operating pressures are relatively low compared with those previously required and can lead to a substantial saving in the quantity of air used. Also, low pressure air jets have been found to be more efficient in disentangling most workpieces than the relatively high pressure ones previously employed.

Figure 6:
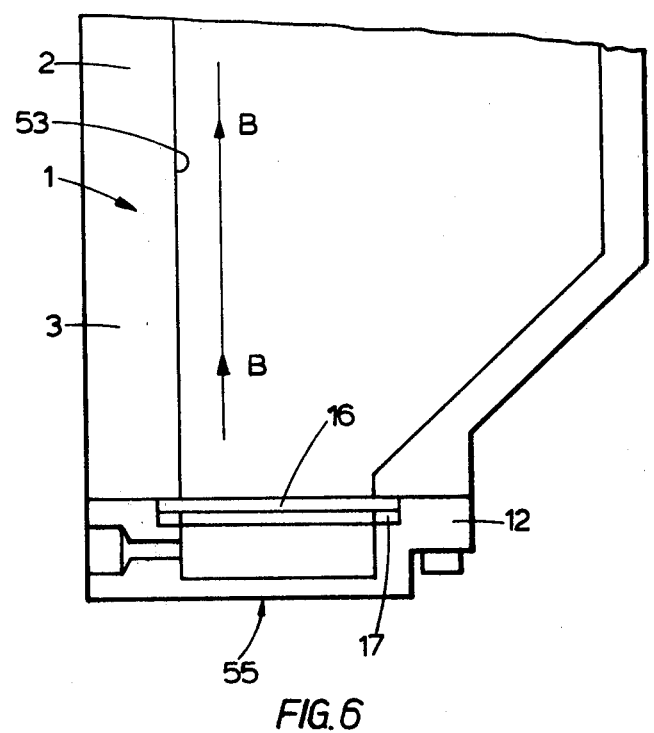
FIG. 6 is a view corresponding to the lower part of FIG. 1 but showing a modification.

The modified disentangler of FIG. 6 differs from the construction of FIG. 1 only in that the lower portion 3 of the body 1 has a vertical rear interior wall 53 to enable the axis of orifice plate 16 to be displaced further to the left in FIG. 6 than in the construction of FIG. 1. This has the advantage that air issuing from orifice plate 16 tends to follow more closely wall 53 to enhance the circulation of the ball of springs.

It will be appreciated that, since the separation of the springs is brought about mainly by brushing of the springs against the plate assembly 7, the ball may initially substantially fill the chamber, as compared with other constructions. This has the considerable advantage that the time between fillings of the disentangler may be substantially increased.

It will also be appreciated that, as compared with the construction of U.S. Pat. No. 2,384,738, the slots 7' of the apparatus described constitute the sole outlet means of the apparatus through which workpieces are dispensed.

We claim:

1. Apparatus for disentangling elongate workpieces of the kind which tend normally to become interengaged or entangled comprising a container defining a chamber, inlet means for introducing air under pressure into the chamber, outlet means through which workpieces pass from said chamber, means to enable workpieces to be introduced into the chamber in bulk, first and second relatively slidable plates of said outlet means held in face contact with each other, said first plate being formed with a first series of slots, and said second plate being formed with a second series of slots each of which overlaps with a respective parallel slot of said first series, whereby the overlapping parts of said first and second series of slots define a third series of slots of adjustable width substantially equal to the transverse dimension of the workpieces to be dispensed.

2. Apparatus as in claim 1 wherein said plates are arranged at an angle of between 25° and 65° to the vertical and facing generally upwardly.

3. Apparatus as in claim 8 wherein said angle is 45°.

4. Apparatus as in claim 1 wherein said first and second series of slots comprise straight parallel slots.

5. Apparatus as in claim 4 wherein said inlet means is arranged to produce a circulatory flow of workpieces in said chamber whereby said workpieces are brushed along said slots.

6. Apparatus for disentangling elongate workpieces of the kind which tend normally to become interengaged or entangled comprising a container defining a chmber, inlet means for introducing air under pressure into said chamber, outlet means through which workpieces pass from said chamber, means to enable workpieces to be introduced into said chamber in bulk, outer and inner relatively slidable plates of said outlet means held in face contact with each other, said plates each being provided with a respective slot overlapping and parallel with the slot in the other plate, whereby a slot of adjustable width is defined by the overlapping parts of said parallel slots, said plates and said slots being inclined to the vertical, means securing said outer plate to said container, said slot in said outer plate being open at its lower end, and a cover secured over said outer plate, whereby dispensed workpieces are guided to the lower end of said slot in said outer plate.

7. Apparatus for disentangling elongate workpieces of the kind which tend normally to become interengaged or entangled comprising a container defining a chamber, inlet means for introducing air under pressure into said chamber, means to enable workpieces to be introduced into said chamber in bulk, two relatively movable members defining an outlet slot of adjustable width substantially equal to the transverse dimension of the workpieces to be dispensed, actuating means for producing relative movement of said movable members to widen said slot, and a means for periodically operating said actuating means.

8. Apparatus as in claim 7 including means for substantially reducing the air flow through said inlet means on widening of said slot.

9. Apparatus as in claim 8 including means providing a time delay between reclosing of said slot to its operating width and the full resumption of said air supply to said inlet means.

10. Apparatus as in claim 7 including adjustment means controlling the minimum width of said slot.

* * * * *